United States Patent
Wang et al.

(10) Patent No.: US 10,692,177 B2
(45) Date of Patent: Jun. 23, 2020

(54) IMAGE PIPELINE WITH DUAL DEMOSAICING CIRCUIT FOR EFFICIENT IMAGE PROCESSING

(71) Applicant: Apple Inc., Cupertino, CA (US)

(72) Inventors: Muge Wang, San Jose, CA (US); David R. Pope, Fremont, CA (US)

(73) Assignee: Apple Inc., Cupertino, CA (US)

( * ) Notice: Subject to any disclaimer, the term of this patent is extended or adjusted under 35 U.S.C. 154(b) by 11 days.

(21) Appl. No.: 16/100,709

(22) Filed: Aug. 10, 2018

(65) Prior Publication Data

US 2020/0051210 A1 Feb. 13, 2020

(51) Int. Cl.
| | |
|---|---|
| *G06T 3/40* | (2006.01) |
| *G06T 1/20* | (2006.01) |
| *G06T 7/20* | (2017.01) |
| *G06T 5/00* | (2006.01) |

(52) U.S. Cl.
CPC .............. *G06T 3/4015* (2013.01); *G06T 1/20* (2013.01); *G06T 5/002* (2013.01); *G06T 7/20* (2013.01)

(58) Field of Classification Search
CPC ....... G06T 3/4015; G06T 5/003; G06T 5/002; G06T 1/20; H04N 2209/046

USPC ................. 382/162, 167; 348/71, 222.1, 246
See application file for complete search history.

(56) References Cited

U.S. PATENT DOCUMENTS

| | | | |
|---|---|---|---|
| 8,345,971 B2 | 1/2013 | Zhang et al. | |
| 8,467,088 B2 | 6/2013 | Hosaka | |
| 9,030,569 B2 | 5/2015 | Ohba et al. | |
| 2010/0225673 A1* | 9/2010 | Miller | G09G 3/2003 345/690 |
| 2012/0206582 A1* | 8/2012 | DiCarlo | G06T 3/4015 348/71 |
| 2014/0098265 A1* | 4/2014 | Hosaka | H04N 1/58 348/246 |
| 2015/0363912 A1 | 12/2015 | Elliott et al. | |

\* cited by examiner

*Primary Examiner* — Sam Bhattacharya
(74) *Attorney, Agent, or Firm* — Fenwick & West LLP (57) ABSTRACT

Embodiments relate to a first demosaicing circuit and a second demosaicing circuit that can perform demosaicing of image data. The first demosaicing circuit processes received image data to generate a first demosaiced image for obtaining statistic information on the received image data. The second demosaicing circuit performs demosaicing of the received image data to generate a second demosaiced image. A processing circuit pipeline performs at least one of resampling, noise processing, color processing and output rescaling performed on the second demosaiced image based on the statistics information obtained from the first demosaiced image.

20 Claims, 9 Drawing Sheets

IMAGE PIPELINE WITH DUAL DEMOSAICING CIRCUIT FOR EFFICIENT IMAGE PROCESSING

BACKGROUND

1. Field of the Disclosure

The present disclosure relates a circuit for processing images and more specifically to using demosaicing circuits.

2. Description of the Related Arts

Image data captured by an image sensor or received from other data sources is often processed in an image processing pipeline before further processing or consumption. For example, raw image data may be corrected, filtered, or otherwise modified before being provided to subsequent components such as a video encoder. To perform corrections or enhancements for captured image data, various components, unit stages or modules may be employed.

Such an image processing pipeline may be structured so that corrections or enhancements to the captured image data can be performed in an expedient way without consuming other system resources. Although many image processing algorithms may be performed by executing software programs on central processing unit (CPU), execution of such programs on the CPU would consume significant bandwidth of the CPU and other peripheral resources as well as increase power consumption. Hence, image processing pipelines are often implemented as a hardware component separate from the CPU and dedicated to perform one or more image processing algorithms.

SUMMARY

Embodiments relate to a first demosaicing circuit and a second demosaicing circuit that can perform demosaicing of image data. The first demosaicing circuit processes received image data to generate a first demosaiced image for obtaining statistic information on the received image data. The second demosaicing circuit performs demosaicing of the received image data to generate a second demosaiced image. A processing circuit pipeline performs at least one of resampling, noise processing, color processing and output rescaling performed on the second demosaiced image based on the statistics information.

In some embodiments, the first demosaicing circuit has a latency lower than a latency of the second demosaicing circuit. The first demosaicing circuit may generate the first demosaiced image by obtaining, for each output pixel location, (i) an average of two green pixel values in different rows of the received image data adjacent to the output pixel location, (ii) a weighted average of two red pixel values in a same row of received image data closest to the output pixel location, and/or (iii) a weighted average of two blue pixel values in a same row of pixels of the received image data closest to the output pixel location.

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments relate to efficiently demosaicing image data using a first demosaicing circuit and a second demosaicing circuit. The first demosaicing circuit processes received image data to generate a first demosaiced image for obtaining statistic information on the received image data. The second demosaicing circuit performs demosaicing of the received image data to generate a second demosaiced image. A processing circuit pipeline performs at least one of resampling, noise processing, color processing and output rescaling performed on the second demosaiced image based on the statistics information.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, Calif. Other portable electronic devices, such as wearables, laptops or tablet computers, are optionally used. In some embodiments, the device is not a portable communications device, but is a desktop computer or other computing device that is not designed for portable use. In some embodiments, the disclosed electronic device may include a touch sensitive surface (e.g., a touch screen display and/or a touch pad). An example electronic device described below in conjunction with FIG. 1 (e.g., device 100) may include a touch-sensitive surface for receiving user input. The electronic device may also include one or more other physical user-interface devices, such as a physical keyboard, a mouse and/or a joystick.

Figure 1:
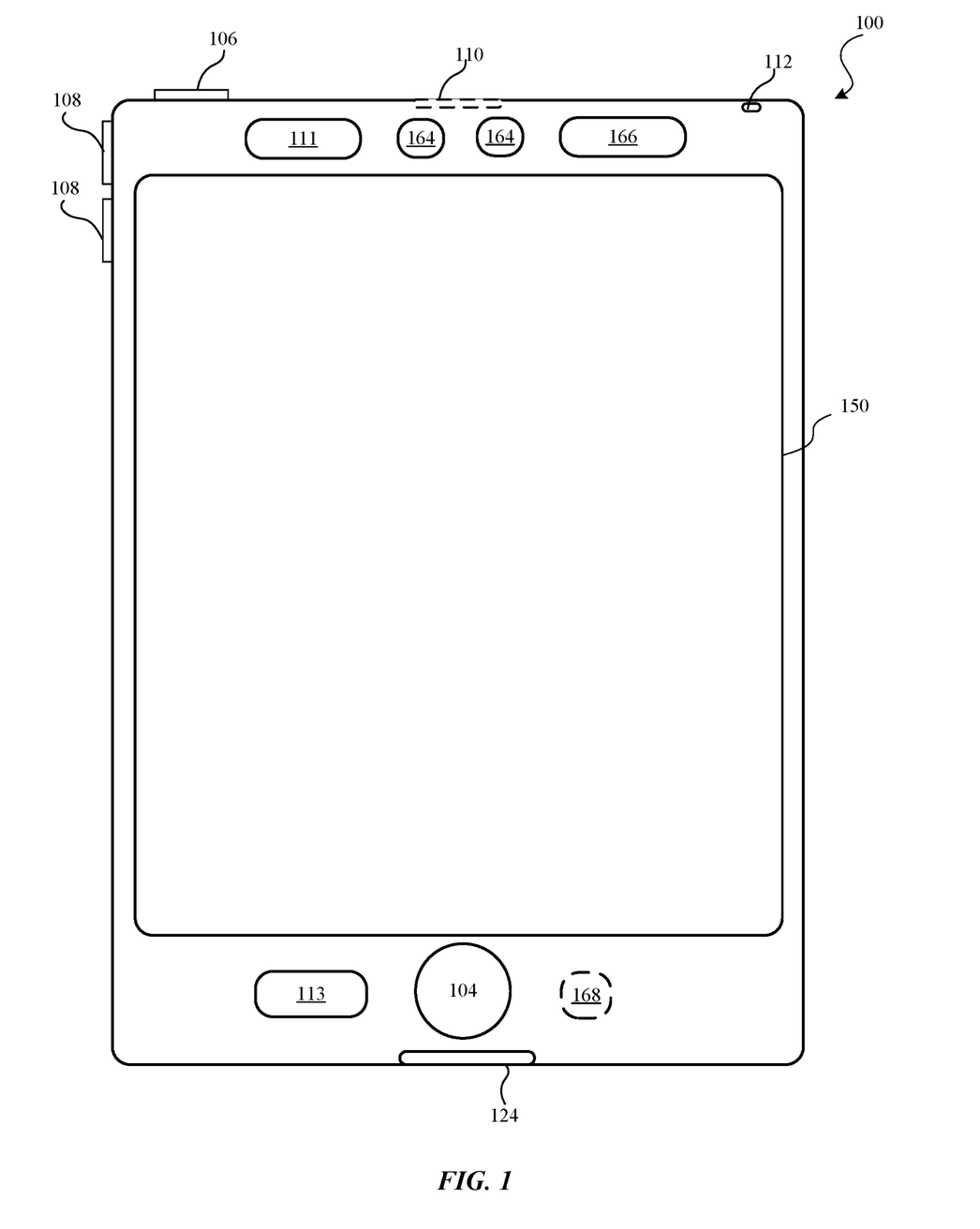
FIG. 1 is a high-level diagram of an electronic device, according to one embodiment

FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. The device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. The device 100 may include components not shown in FIG. 1.

Device 100 is only one example of an electronic device, and device 100 may have more or fewer components than listed above, some of which may be combined into a components or have a different configuration or arrangement. The various components of device 100 listed above are embodied in hardware, software, firmware or a combination thereof, including one or more signal processing and/or application specific integrated circuits (ASICs).

Figure 2:
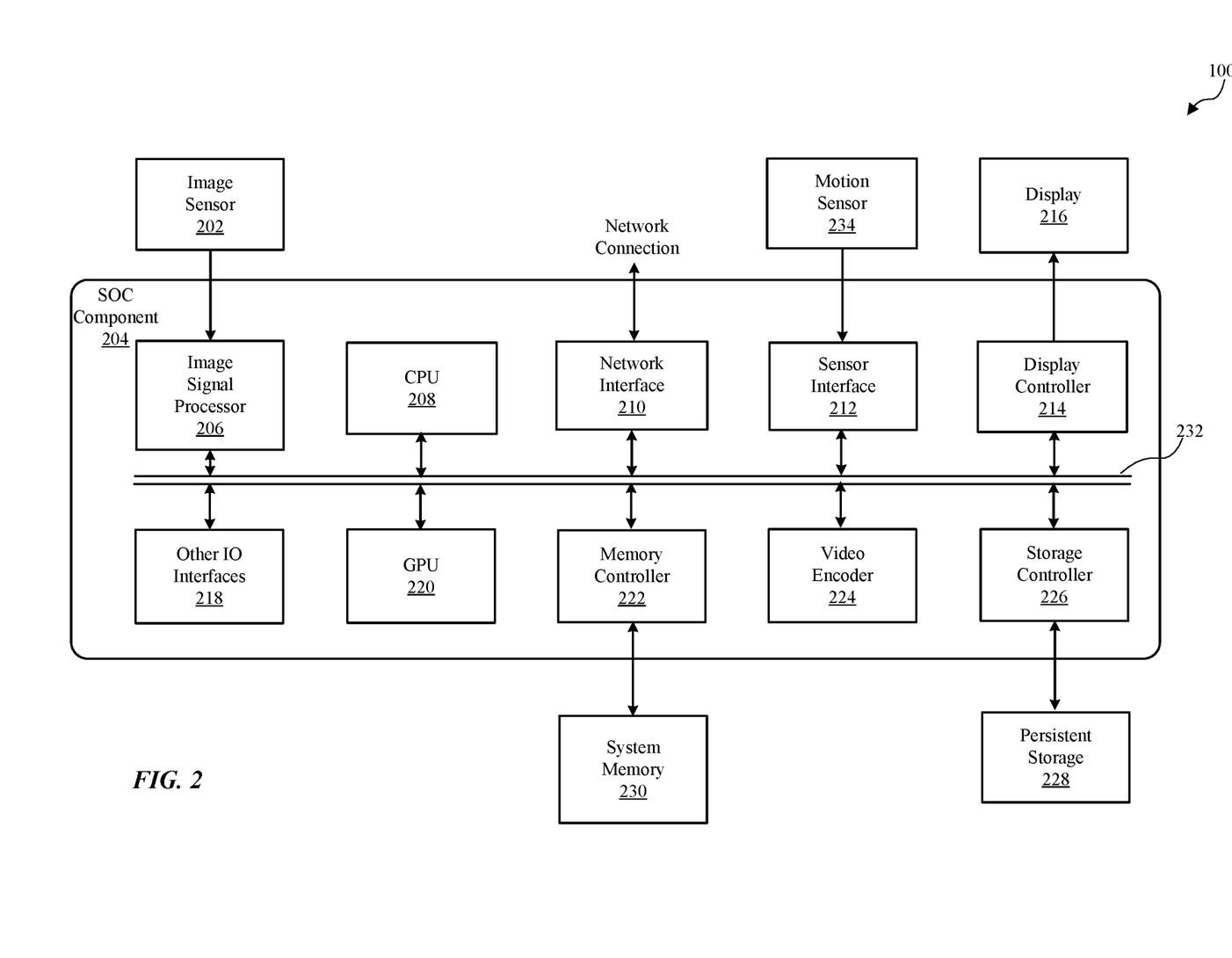
FIG. 2 is a block diagram illustrating components in the electronic device, according to one embodiment.

FIG. 2 is a block diagram illustrating components in device 100, according to one embodiment. Device 100 may perform various operations including image processing. For this and other purposes, the device 100 may include, among other components, image sensor 202, system-on-a chip (SOC) component 204, system memory 230, persistent storage (e.g., flash memory) 228, orientation sensor 234, and display 216. The components as illustrated in FIG. 2 are merely illustrative. For example, device 100 may include other components (such as speaker or microphone) that are not illustrated in FIG. 2. Further, some components (such as orientation sensor 234) may be omitted from device 100.

Image sensor 202 is a component for capturing image data and may be embodied, for example, as a complementary metal-oxide-semiconductor (CMOS) active-pixel sensor) a camera, video camera, or other devices. Image sensor 202 generates raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensor 202 may be in a Bayer color filter array (CFA) pattern (hereinafter also referred to as "Bayer pattern").

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light emitting diode (OLED) device. Based on data received from SOC component 204, display 116 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof. In some embodiments, system memory 230 may store pixel data or other image data or statistics in various formats.

Persistent storage 228 is a component for storing data in a non-volatile manner. Persistent storage 228 retains data even when power is not available. Persistent storage 228 may be embodied as read-only memory (ROM), flash memory or other non-volatile random access memory devices.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, sensor interface 212, display controller 214, graphics processor (GPU) 220, memory controller 222, video encoder 224, storage controller 226, and various other input/output (I/O) interfaces 218, and bus 232 connecting these subcomponents. SOC component 204 may include more or fewer subcomponents than those shown in FIG. 2.

ISP 206 is hardware that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations, as described below in detail with reference to FIG. 3.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

I/O interfaces 218 are hardware, software, firmware or combinations thereof for interfacing with various input/output components in device 100. I/O components may include devices such as keypads, buttons, audio devices, and sensors such as a global positioning system. I/O interfaces 218 process data for sending data to such I/O components or process data received from such I/O components.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206, such as discussed below in FIG. 3) and display. The networks may include, but are not limited to, Local Area Networks (LANs) (e.g., an Ethernet or corporate network) and Wide Area Networks (WANs). The image data received via network interface 210 may undergo image processing processes by ISP 206.

Sensor interface 212 is circuitry for interfacing with motion sensor 234. Sensor interface 212 receives sensor information from motion sensor 234 and processes the sensor information to determine the orientation or movement of the device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 128 or for passing the data to network interface w10 for transmission over a network to another device.

In some embodiments, one or more subcomponents of SOC component 204 or some functionality of these subcomponents may be performed by software components executed on ISP 206, CPU 208 or GPU 220. Such software components may be stored in system memory 230, persistent storage 228 or another device communicating with device 100 via network interface 210.

Image data or video data may flow through various data paths within SOC component 204. In one example, raw image data may be generated from the image sensor 202 and processed by ISP 206, and then sent to system memory 230 via bus 232 and memory controller 222. After the image data is stored in system memory 230, it may be accessed by video encoder 224 for encoding or by display 116 for displaying via bus 232.

In another example, image data is received from sources other than the image sensor 202. For example, video data may be streamed, downloaded, or otherwise communicated to the SOC component 204 via wired or wireless network. The image data may be received via network interface 210 and written to system memory 230 via memory controller 222. The image data may then be obtained by ISP 206 from system memory 230 and processed through one or more image processing pipeline stages, as described below in detail with reference to FIG. 3. The image data may then be returned to system memory 230 or be sent to video encoder 224, display controller 214 (for display on display 216), or storage controller 226 for storage at persistent storage 228.

Example Image Signal Processing Pipelines

Figure 3:
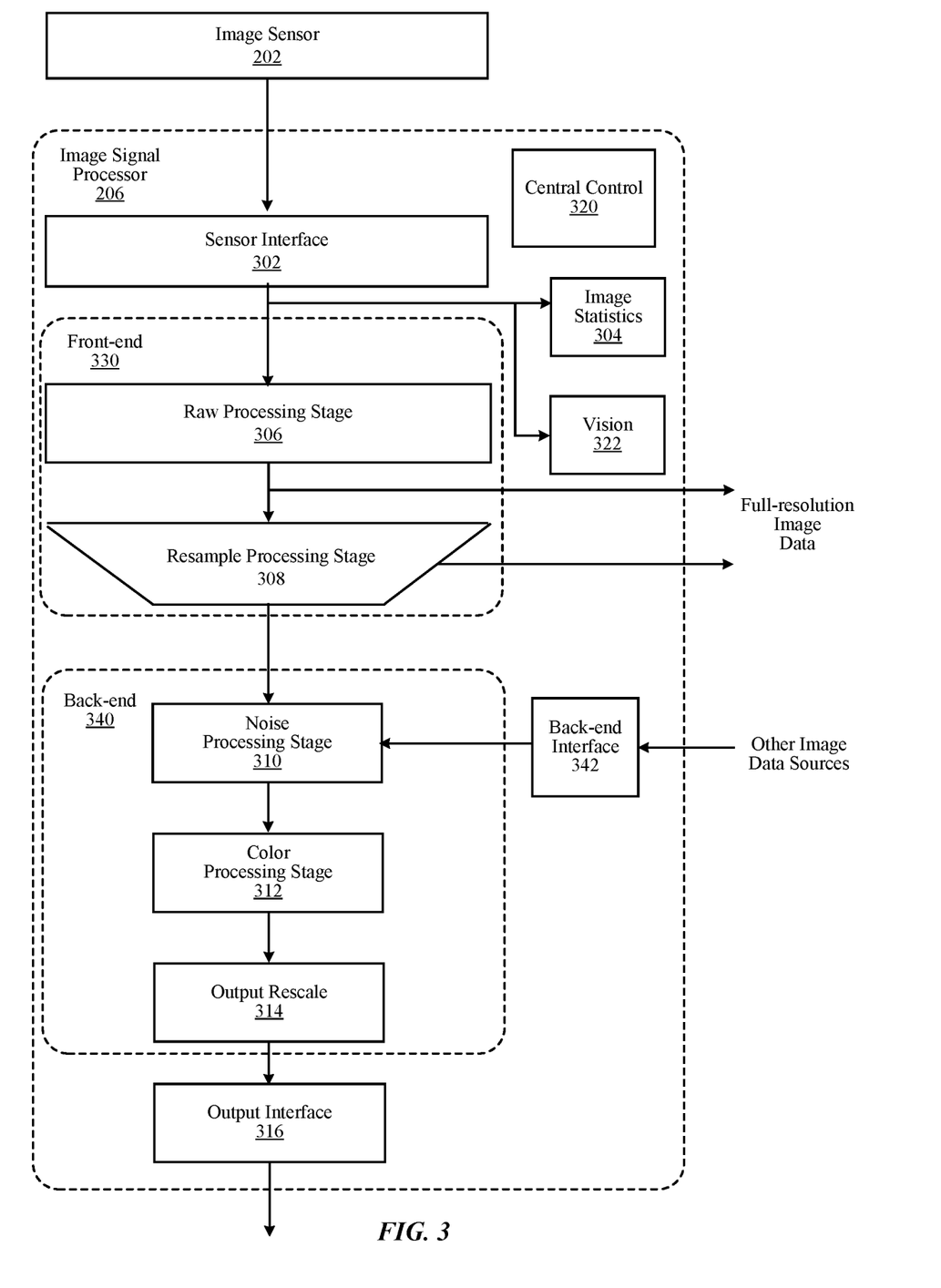
FIG. 3 is a block diagram illustrating image processing pipelines implemented using an image signal processor, according to one embodiment.

FIG. 3 is a block diagram illustrating image processing pipelines implemented using ISP 206, according to one embodiment. In the embodiment of FIG. 3, ISP 206 is coupled to image sensor 102 to receive raw image data. ISP 206 implements an image processing pipeline which may include a set of stages that process image information from creation, capture or receipt to output. ISP 206 may include, among other components, sensor interface 302, central control module 320, front-end pipeline stages 330, back-end pipeline stages 340, image statistics module 304, vision module 322, back-end interface 342, and output interface 316. ISP 206 may include other components not illustrated in FIG. 3 or may omit one or more components illustrated in FIG. 3.

Sensor interface 302 receives raw image data from image sensor 202 and processes the raw image data into an image data processable by other stages in the pipeline. Sensor interface 302 may perform various preprocessing operations, such as image cropping, binning or scaling to reduce image data size. In some embodiments, pixels are sent from the image sensor 202 to sensor interface 302 in raster order (i.e., horizontally, line by line). The subsequent processes in the pipeline may also be performed in raster order and the result may also be output in raster order. Although only a single image sensor and a single sensor interface 302 are illustrated in FIG. 3, when more than one image sensor is provided in device 100, a corresponding number of sensor interfaces may be provided in ISP 206 to process raw image data from each image sensor.

Front-end pipeline stages 330 process image data in raw or full-color domains. Front-end pipeline stages 330 may include, but are not limited to, raw processing stage 306 and resample processing stage 308. A raw image data may be in Bayer raw format, for example. In Bayer raw image format, pixel data with values specific to a particular color (instead of all colors) is provided in each pixel. In an image capturing sensor, image data is typically provided in a Bayer pattern. Raw processing stage 306 may process image data in a Bayer raw format.

The operations performed by raw processing stage 306 include, but are not limited, sensor linearization, black level compensation, fixed pattern noise reduction, defective pixel correction, raw noise filtering, lens shading correction, white balance gain, and highlight recovery. Sensor linearization refers to mapping non-linear image data to linear space for other processing. Black level compensation refers to providing digital gain, offset and clip independently for each color component (e.g., Gr, R, B, Gb) of the image data. Fixed pattern noise reduction refers to removing offset fixed pattern noise and gain fixed pattern noise by subtracting a dark frame from an input image and multiplying different gains to pixels. Defective pixel correction refers to detecting defective pixels, and then replacing defective pixel values. Raw noise filtering refers to reducing noise of image data by averaging neighbor pixels that are similar in brightness. Highlight recovery refers to estimating pixel values for those pixels that are clipped (or nearly clipped) from other channels. Lens shading correction refers to applying a gain per pixel to compensate for a dropoff in intensity roughly proportional to a distance from a lens optical center. White balance gain refers to providing digital gains for white balance, offset and clip independently for all color components (e.g., Gr, R, B, Gb in Bayer format). Components of ISP 206 may convert raw image data into image data in full-color domain, and thus, raw processing stage 306 may process image data in the full-color domain in addition to or instead of raw image data.

Figure 4:
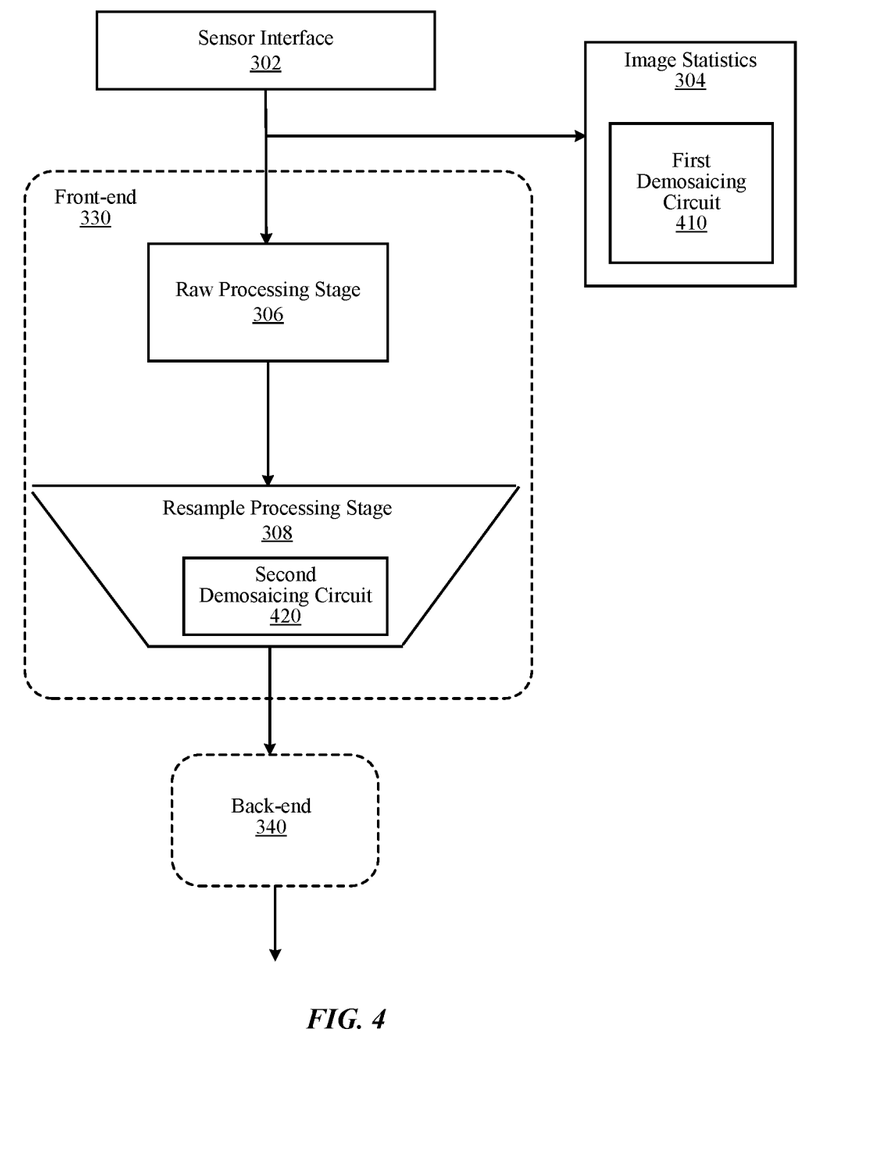
FIG. 4 is a block diagram illustrating a first demosaicing circuit, a second demosaicing circuit, and its surrounding circuits, according to one embodiment.

Resample processing stage 308 performs various operations to convert, resample, or scale image data received from raw processing stage 306. Operations performed by resample processing stage 308 may include, but not limited to, demosaic operation, per-pixel color correction operation, Gamma mapping operation, color space conversion and downscaling or sub-band splitting. Demosaic operation refers to converting or interpolating missing color samples from raw image data (for example, in a Bayer pattern) to output image data into a full-color domain. Demosaic operation may include low pass directional filtering on the interpolated samples to obtain full-color pixels. The resample processing stage 308 may include a second demosaicing circuit 420 to perform the demosaic operation. Per-pixel color correction operation refers to a process of performing color correction on a per-pixel basis using information about relative noise standard deviations of each color channel to correct color without amplifying noise in the image data. Gamma mapping refers to converting image data from input image data values to output data values to perform special image effects, including black and white conversion, sepia tone conversion, negative conversion, or solarize conversion. For the purpose of Gamma mapping, lookup tables (or other structures that index pixel values to another value) for different color components or channels of each pixel (e.g., a separate lookup table for Y, Cb, and Cr color components) may be used. Color space conversion refers to converting color space of an input image data into a different format. In one embodiment, resample processing stage 308 converts RBD format into YCbCr format for further processing.

Central control module 320 may control and coordinate overall operation of other components in ISP 206. Central control module 320 performs operations including, but not limited to, monitoring various operating parameters (e.g., logging clock cycles, memory latency, quality of service, and state information), updating or managing control parameters for other components of ISP 206, and interfacing with sensor interface 302 to control the starting and stopping of other components of ISP 206. For example, central control module 320 may update programmable parameters for other components in ISP 206 while the other components are in an idle state. After updating the programmable parameters, central control module 320 may place these components of ISP 206 into a run state to perform one or more operations or tasks. Central control module 320 may also instruct other components of ISP 206 to store image data (e.g., by writing to system memory 230 in FIG. 2) before, during, or after resample processing stage 308. In this way full-resolution image data in raw or full-color domain format may be stored in addition to or instead of processing the image data output from resample processing stage 308 through backend pipeline stages 340.

Image statistics module 304 performs various operations to collect statistic information associated with the image data. The operations for collecting statistics information may include, but not limited to, sensor linearization, mask patterned defective pixels, sub-sample raw image data, detect and replace non-patterned defective pixels, black level compensation, lens shading correction, and inverse black level compensation. After performing one or more of such operations, statistics information such as 3A statistics (Auto white balance (AWB), auto exposure (AE), auto focus (AF)), histograms (e.g., 2D color or component) and any other image data information may be collected or tracked. In some embodiments, certain pixels' values, or areas of pixel values may be excluded from collections of certain statistics data (e.g., AF statistics) when preceding operations identify clipped pixels. Although only a single statistics module 304 is illustrated in FIG. 3, multiple image statistics modules may be included in ISP 206. In such embodiments, each statistic module may be programmed by central control module 320 to collect different information for the same or different image data.

Vision module 322 performs various operations to facilitate computer vision operations at CPU 208 such as facial detection in image data. The vision module 322 may perform various operations including pre-processing, global tone-mapping and Gamma correction, vision noise filtering, resizing, keypoint detection, generation of histogram-of-orientation gradients (HOG) and normalized cross correlation (NCC). The pre-processing may include subsampling or binning operation and computation of luminance if the input image data is not in YCrCb format. Global mapping and Gamma correction can be performed on the pre-processed data on luminance image. Vision noise filtering is performed to remove pixel defects and reduce noise present in the image data, and thereby, improve the quality and performance of subsequent computer vision algorithms. Such vision noise filtering may include detecting and fixing dots or defective pixels, and performing bilateral filtering to reduce noise by averaging neighbor pixels of similar brightness. Various vision algorithms use images of different sizes and scales. Resizing of an image is performed, for example, by binning or linear interpolation operation. Keypoints are locations within an image that are surrounded by image patches well suited to matching in other images of the same scene or object. Such keypoints are useful in image alignment, computing camera pose and object tracking. Keypoint detection refers to the process of identifying such keypoints in an image. HOG provides descriptions of image patches for tasks in mage analysis and computer vision. HOG can be generated, for example, by (i) computing horizontal and vertical gradients using a simple difference filter, (ii) computing gradient orientations and magnitudes from the horizontal and vertical gradients, and (iii) binning the gradient orientations. NCC is the process of computing spatial cross correlation between a patch of image and a kernel.

Back-end interface 342 receives image data from other image sources than image sensor 202 and forwards it to other components of ISP 206 for processing. For example, image data may be received over a network connection and be stored in system memory 230. Back-end interface 342 retrieves the image data stored in system memory 230 and provide it to back-end pipeline stages 340 for processing. One of many operations that are performed by back-end interface 342 is converting the retrieved image data to a format that can be utilized by back-end processing stages 340. For instance, back-end interface 342 may convert RGB, YCbCr 4:2:0, or YCbCr 4:2:2 formatted image data into YCbCr 4:4:4 color format.

Back-end pipeline stages 340 processes image data according to a particular full-color format (e.g., YCbCr 4:4:4 or RGB). In some embodiments, components of the back-end pipeline stages 340 may convert image data to a particular full-color format before further processing. Back-end pipeline stages 340 may include, among other stages, noise processing stage 310 and color processing stage 312. Back-end pipeline stages 340 may include other stages not illustrated in FIG. 3.

Noise processing stage 310 performs various operations to reduce noise in the image data. The operations performed by noise processing stage 310 include, but are not limited to, color space conversion, gamma/de-gamma mapping, temporal filtering, noise filtering, luma sharpening, and chroma noise reduction. The color space conversion may convert an image data from one color space format to another color space format (e.g., RGB format converted to YCbCr format). Gamma/de-gamma operation converts image data from input image data values to output data values to perform special image effects. Temporal filtering filters noise using a previously filtered image frame to reduce noise. For example, pixel values of a prior image frame are combined with pixel values of a current image frame. Noise filtering may include, for example, spatial noise filtering. Luma sharpening may sharpen luma values of pixel data while chroma suppression may attenuate chroma to gray (i.e. no color). In some embodiment, the luma sharpening and chroma suppression may be performed simultaneously with spatial nose filtering. The aggressiveness of noise filtering may be determined differently for different regions of an image. Spatial noise filtering may be included as part of a temporal loop implementing temporal filtering. For example, a previous image frame may be processed by a temporal filter and a spatial noise filter before being stored as a reference frame for a next image frame to be processed. In other embodiments, spatial noise filtering may not be included as part of the temporal loop for temporal filtering (e.g., the spatial noise filter may be applied to an image frame after it is stored as a reference image frame (and thus is not a spatially filtered reference frame).

Color processing stage 312 may perform various operations associated with adjusting color information in the image data. The operations performed in color processing stage 312 include, but are not limited to, local tone mapping, gain/offset/clip, color correction, three-dimensional color lookup, gamma conversion, and color space conversion. Local tone mapping refers to spatially varying local tone curves in order to provide more control when rendering an image. For instance, a two-dimensional grid of tone curves (which may be programmed by the central control module 320) may be bi-linearly interpolated such that smoothly varying tone curves are created across an image. In some embodiments, local tone mapping may also apply spatially varying and intensity varying color correction matrices, which may, for example, be used to make skies bluer while turning down blue in the shadows in an image. Digital gain/offset/clip may be provided for each color channel or component of image data. Color correction may apply a color correction transform matrix to image data. 3D color lookup may utilize a three dimensional array of color component output values (e.g., R, G, B) to perform advanced tone mapping, color space conversions, and other color transforms. Gamma conversion may be performed, for example, by mapping input image data values to output data values in order to perform gamma correction, tone mapping, or histogram matching. Color space conversion may be implemented to convert image data from one color space to another (e.g., RGB to YCbCr). Other processing techniques may also be performed as part of color processing stage 312 to perform other special image effects, including black and white conversion, sepia tone conversion, negative conversion, or solarize conversion.

Output rescale module 314 may resample, transform and correct distortion on the fly as the ISP 206 processes image data. Output rescale module 314 may compute a fractional input coordinate for each pixel and uses this fractional coordinate to interpolate an output pixel via a polyphase resampling filter. A fractional input coordinate may be produced from a variety of possible transforms of an output coordinate, such as resizing or cropping an image (e.g., via a simple horizontal and vertical scaling transform), rotating and shearing an image (e.g., via non-separable matrix transforms), perspective warping (e.g., via an additional depth transform) and per-pixel perspective divides applied in piecewise in strips to account for changes in image sensor during image data capture (e.g., due to a rolling shutter), and geometric distortion correction (e.g., via computing a radial distance from the optical center in order to index an interpolated radial gain table, and applying a radial perturbance to a coordinate to account for a radial lens distortion).

Output rescale module 314 may apply transforms to image data as it is processed at output rescale module 314. Output rescale module 314 may include horizontal and vertical scaling components. The vertical portion of the design may implement series of image data line buffers to hold the "support" needed by the vertical filter. As ISP 206 may be a streaming device, it may be that only the lines of image data in a finite-length sliding window of lines are available for the filter to use. Once a line has been discarded to make room for a new incoming line, the line may be unavailable. Output rescale module 314 may statistically monitor computed input Y coordinates over previous lines and use it to compute an optimal set of lines to hold in the vertical support window. For each subsequent line, output rescale module may automatically generate a guess as to the center of the vertical support window. In some embodiments, output rescale module 314 may implement a table of piecewise perspective transforms encoded as digital difference analyzer (DDA) steppers to perform a per-pixel perspective transformation between a input image data and output image data in order to correct artifacts and motion caused by sensor motion during the capture of the image frame. Output rescale may provide image data via output interface 316 to various other components of system 100, as discussed above with regard to FIGS. 1 and 2.

In various embodiments, the functionally of components 302 through 342 may be performed in a different order than the order implied by the order of these functional units in the image processing pipeline illustrated in FIG. 3, or may be performed by different functional components than those illustrated in FIG. 3. Moreover, the various components as described in FIG. 3 may be embodied in various combinations of hardware, firmware or software.

Provision of Two Demosaicing Circuits

A demosaicing circuit reconstructs a color image from an incomplete color output from an image sensor. For example, the image sensor 202 may be overlaid with a Bayer CFA pattern and provide image data in a Bayer format (e.g., Gr, R, B, Gb) with each repeating 2×2 region that defines a Bayer Quad represented by two green pixels diagonal to each other, a red pixel, and blue pixel. The demosaiced image (e.g., color image) produced by the demosaicing circuit has, for example, a red, green, and blue color component for each output image pixel (e.g., location). In some embodiments, one output pixel with red, green, and blue color components may correspond to each input Bayer patterned RAW pixel (e.g., Gr, R, B, or Gb). In other embodiments, as described below in regards to the first demosaicing circuit 410 and simplified demosaicing mechanism, each output image pixel is located at the intersection (e.g., corner) of four input pixels in the Bayer Quad. Pixel values of the received image data from the image sensor 202 may be duplicated to the closest same type of pixel value around one or more edges of the received image data before the demosaicing circuit reconstructs the color image.

FIG. 4 is a block diagram illustrating a first demosaicing circuit 410, a second demosaicing circuit 420, and its surrounding circuits, according to one embodiment. In the embodiment of FIG. 4, the first demosaicing circuit 410 is part of the image statistic circuit 304 while the second demosaicing circuit 420 is part of the resample processing stage 308, which is, in turn, part of the front-end 330 of ISP 206.

The first demosaicing circuit 410 receives image data from image sensor 202 via a sensor interface 302. The first demosaicing circuit 410 processes the received image data to generate a first demosaiced image for obtaining statistics information on the received image data. The first demosaicing circuit 410 may include a line buffer to store information of one line of data of the image data for generating the first demosaiced image. The image statistics module 304 can then perform various operations to collect statistic information associated with the first demosaiced image data.

The second demosaicing circuit 420 receives image data from raw processing stage 306. The second demosaicing circuit 420 processes the received image data to generate a second demosaiced image using a conventional method involving low pass directional filtering on interpolated samples to obtain full-color pixels, as well known in the art. Other stages such as other processes in the resample processing stage 308, noise processing stage 310, color processing stage 312, and output rescale module 314 can then process the second demosaiced image.

The first demosaicing circuit 410 has a latency lower than a latency of the second demosaicing circuit 420 using a simplified demosaicing mechanism described below in detail with reference to FIGS. 5A through 5L. Thus, the first demosaiced image is generated before the second demosaiced image, and the image statistics information from the first demosaiced image may be generated before the second demosaiced image is processed by other stages in the ISP 206 including and following the raw processing stage 306. Thus, a processing circuit pipeline (e.g., ISP 206) can leverage the image statistics information computed from the first demosaiced image to more efficiently process the second demosaiced image in the pipeline. A processing circuit pipeline (e.g., ISP 206) performs at least one of resampling, noise processing, color processing, and output rescaling on the second demosaiced image based on the statistics information. Due to the lower latency of the first demosaicing circuit, the statistics information from processing the first demosaiced image can be provided back to ISP 206 to assist 3A (AWB, AE, and AF), noise processing, and color processing, etc. of the second demosaiced image. For example, the ISP 206 may use a machine learning method to perform image understanding such as scene type detection, image segmentation, etc. The ISP 206 may detect a snow scene from the first demosaiced image, and the ISP 206 can use this information to adjust the exposure value higher to process the second demosaiced image. The ISP 206 may detect grass or texture from the first demosaiced image, and turn on stronger sharpening to process the second demosaiced image.

Simplified Demosaicing Mechanism

Figure 5A:
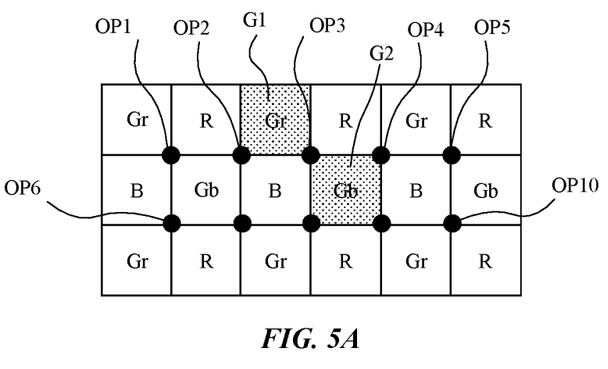
FIGS. 5A through 5L are illustrative examples of demosaicing image data for color components by a first demosaicing circuit, according to one embodiment.

FIG. 5A is an illustrative example of demosaicing image data for a green color component by a first demosaicing circuit, according to one embodiment. FIG. 5A shows a portion of the received image data from a source in a Bayer format. The first demosaicing circuit 410 generates a green color component of an output pixel of the first demosaiced image by obtaining an average of two green pixel values in different rows of the received image data adjacent to each intersection location (e.g., OP1 to OP10, hereinafter also referred to as output pixel location) corresponding to the output pixel. For example, the first demosaicing circuit 410 computes an average of a green pixel value G1 in a first row and a green pixel value G2 for a green pixel value (e.g., (G1+G2)/2) in a second row adjacent to intersection location OP3 corresponding to an output pixel. In one embodiment, an average value of the green pixel values can be rounded up or down. For example, the rounded average value of green pixel values may be computed by adding an offset to the sum of the values G1 and G2 of the green pixels and then shifting the bits of the result one position (e.g., (G1+G2+1)>>1). The offset (e.g., 1) is half of the divisor value (e.g., 2) used when computing the average.

Figure 5B:
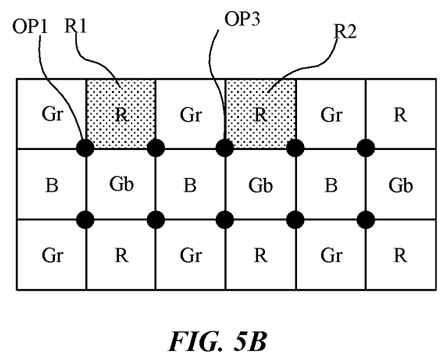

FIG. 5B is an illustrative example of demosaicing image data for a red color component by a first demosaicing circuit, according to one embodiment. FIG. 5B shows a portion of the received image data from a source in a Bayer format. The first demosaicing circuit 410 generates a red color component for the output pixel of the first demosaiced image by obtaining a weighted average of two red pixel values in a same row of received image data closest to the intersection location OP3. For example, the first demosaicing circuit 410 computes a weighted average of the red pixel value R1 and R2 in a first row for location OP3 (corresponding to an output pixel). In the weighted average, one of the red pixel values is weighted three times another of the red pixel values (e.g., (R1+3*R2)/4). In one embodiment, the weighted average value of the red pixel values can be rounded up or down. For example, the rounded average value of red pixel values may be computed by adding an offset to the sum of the weighted values R1 and 3*R2 of the red pixels and then shifting the bits of the result two positions (e.g., (R1+3*R2+2)>>2). The offset (e.g., 2) is half of the divisor value (e.g., 4) used when computing the weighted average.

Figure 5C:
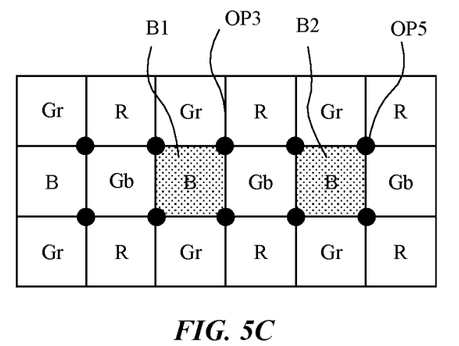

FIG. 5C is an illustrative example of demosaicing image data for a blue color component by a first demosaicing circuit, according to one embodiment. FIG. 5C shows a portion of the received image data from a source in a Bayer format. The first demosaicing circuit 410 generates a blue color component for the output pixel by obtaining a weighted average of two blue pixel values in a same row of received image data closest to the intersection location OP3. In the weighted average, one of the blue pixel values is weighted three times another of the blue pixel values. For example, the first demosaicing circuit 410 computes a weighted average of the blue pixel value B1 and B2 in a second row (e.g., (3*B1+B2)/4) as the blue pixel value for the output pixel. In one embodiment, the weighted average value of the blue pixel values can be rounded up or down. For example, the rounded average value of blue pixel values may be computed by adding an offset to the sum of the weighted values of the blue pixels and then shifting the bits of the result two positions (e.g., (3*B1+B2+2)>>2). The offset (e.g., 2) is half of the divisor value (e.g., 4) used when computing the weighted average.

Figure 5D:
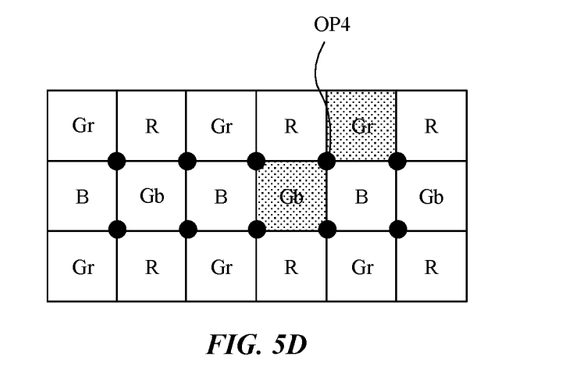
Figure 5E:
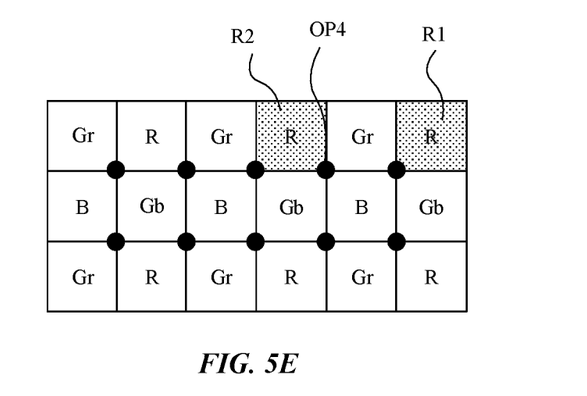
Figure 5F:
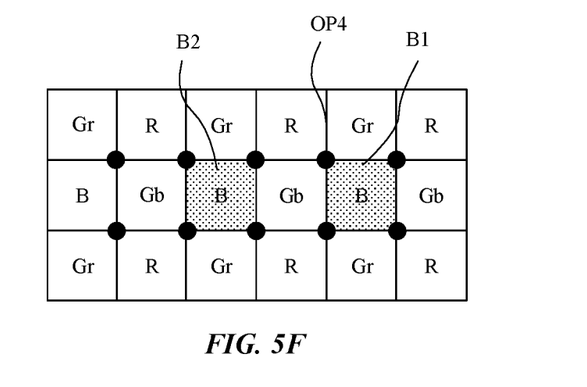
Figure 5G:
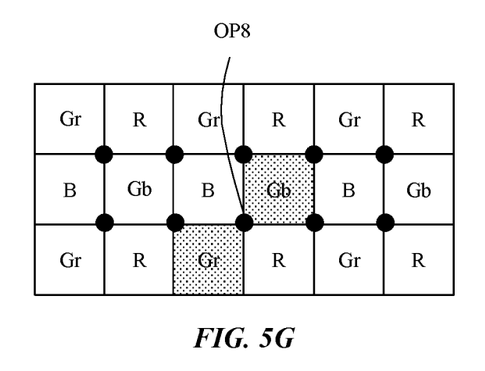
Figure 5H:
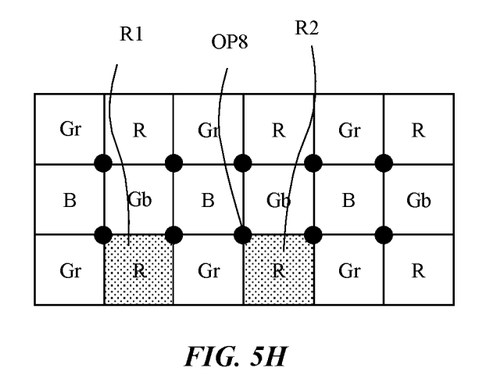
Figure 5I:
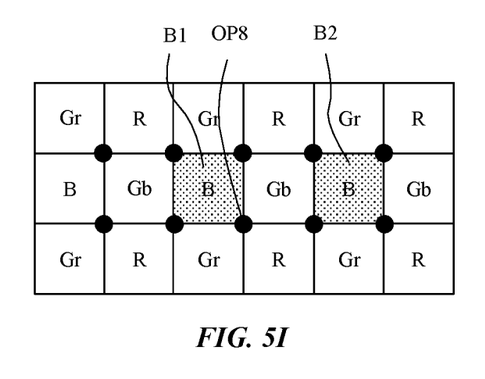
Figure 5J:
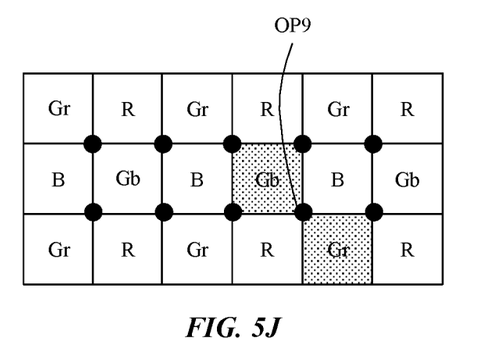
Figure 5K:
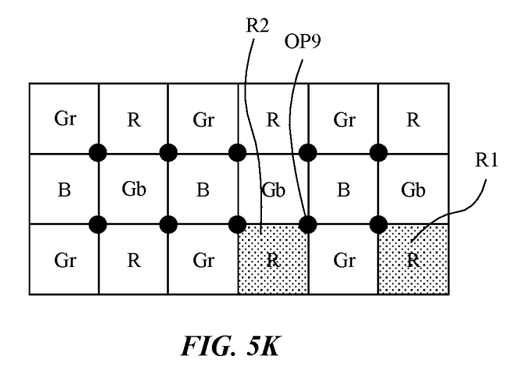
Figure 5L:
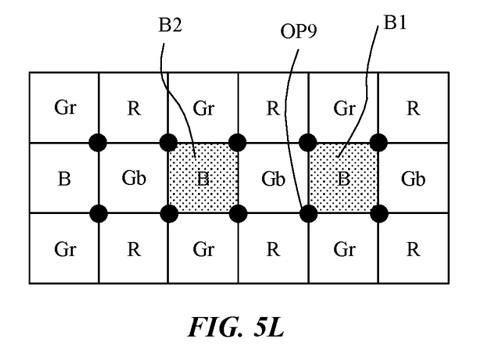

For raw format with Bayer pattern, there are four types of color arrangements with regard to the relative Bayer pattern order. For every intersection locations (e.g., OP1, OP2, etc. as shown in FIG. 5A) corresponding to an output pixel, the raw pixel at its upper left can either be Gr, R, B, or Gb. FIGS. 5A, 5B and 5C illustrate the generation of demosaiced G, R, and B color components for the output pixel corresponding to intersection location OP3 with the raw pixel at its upper left of Gr (i.e., a first type of color arrangement), respectively. FIGS. 5D, 5E, and 5F illustrate the generation of demosaiced G, R, and B color components for another output pixel corresponding to intersection location OP4 with the raw pixel at its upper left of R (i.e., a second type of color arrangement), respectively. FIGS. 5G, 5H, and 5I illustrate the generation of demosaiced G, R, and B color components for yet another output pixel corresponding to intersection location OP8 with the raw pixel at its upper left of B (i.e., a third type of color arrangement), respectively. FIGS. 5J, 5K, and 5L illustrate the generation of demosaiced G, R, and B color components for the output pixel corresponding to intersection location OP9 with the raw pixel at its upper left of Gb (e.g., a fourth type of color arrangement), respectively. For output pixels of second, third, and fourth type of color arrangement, the demosaicing methods are similar to what are illustrated in FIGS. 5A, 5B and 5C (i.e., first type of color arrangement) such as the following: (i) The demosaiced G color component is obtained as an average of two green-pixel values in different rows of the received image data adjacent to the intersection location, (ii) the demosaiced R color component is obtained as a weighted average of two red pixel values in a same row of received image data closest to the intersection location, and (iii) the demosaiced B color component is obtained as a weighted average of two blue pixel values in a same row of received image data closest to the intersection location. The two green pixels used for obtaining the demosaiced G color component come from a current row and the row that immediately precedes the current row. Depending on the type of color arrangement of the pixel, the two red pixels in the same row used for obtaining the demosaiced R color component may come from the same row as the current row, or from the row that immediately precedes the current row. The same applies to obtaining the demosaiced B color component: that is, the blue pixels in the same row may come either from the current row, or the row immediately preceding the current row.

For computing color component values of output pixel locations of the first demosaiced image on a frame edge of the received image data, values of pixels of the received image data outside of a frame edge in a horizontal direction of the received image data are replicated from values of pixels on the edge of the same Bayer color. For example, in FIG. 5B, an intersection location OP1 in the first row may not have a corresponding left hand side red pixel value for a weighted average. The closest red pixel (labeled R1) can be replicated to correspond to a red pixel value to the left of the first Gr pixel in the first row. For example, a red color component of the first output pixel location in the first row of the first demosaiced image can be the weighted average of R1 and R1, which can be R1. A similar technique can be utilized for computing a blue color component of the last intersection location OP5 of the first row in the example of FIG. 5C. For example, the blue color component of the last intersection location OP5 of the first row of the first demosaiced image becomes the weighted average of B2 and B2, which can be B2.

A first demosaicing circuit 410 utilizing the simplified demosaicing algorithm described in FIGS. 5A through 5L can compute color components of a row of a first demosaiced image with two rows of image data received from an image sensor. The first demosaicing circuit may include a single line buffer for storing a previous line of received image data from the image sensor. The first demosaicing circuit can process the color components of pixels in a row of the first demosaiced image by using a current line of received image data and accessing the single line buffer with the previous line of received image data. The first demosaicing circuit 410 can process the color components in a row of pixels of the first demosaiced image as soon as it starts to receive the second row of image data from the image sensor. The first demosaicing circuit 410 can use a single line buffer for storing a row of pixels for the computation of the color components in a row of pixels instead of multiple line buffers.

Figure 6:
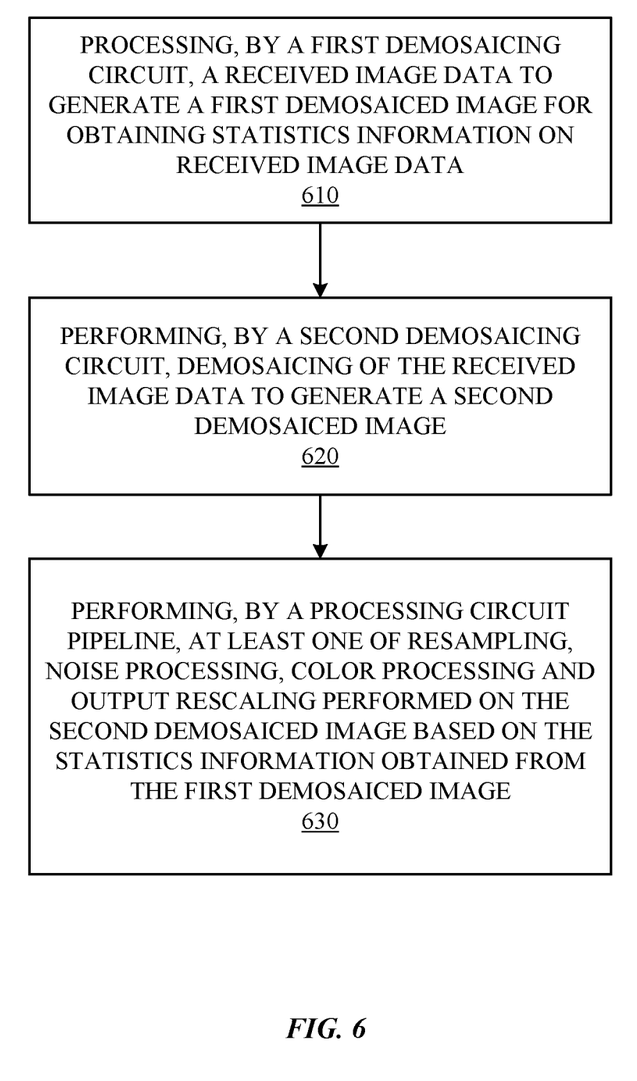
FIG. 6 is a flowchart illustrating a method of demosaicing image data using a first and a second demosaicing circuits, according to one embodiment.

In some embodiments, the first demosaicing circuit 410 uses a simplified demosaicing algorithm that further skips or bins pixels to generate downscaled images with low latency. Performing Image Processing Using Two Demosaicing Circuits FIG. 6 is a flowchart illustrating a method of demosaicing image data using a first and a second demosaicing circuits, according to one embodiment. The first demosaicing circuit (e.g., first demosaicing circuit 410) is included in an image statistics circuit (e.g., image statistics circuit 304) of a processing pipeline (e.g., ISP 206). The second demosaicing circuit (e.g., second demosaicing circuit 420) is included in a resample processing stage (e.g., resample processing stage 308) of the processing pipeline.

The first demosaicing circuit processes 610 a received image data to generate a first demosaiced image for obtaining statistics information on the received image data. The first demosaicing circuit can process the received image data by, for each output pixel location, (i) obtaining an average of two green pixel values in different rows of the received image data adjacent to the output pixel location, (ii) obtaining a weighted average of two red pixel values in a same row of received image data closest to the output pixel location, and (iii) obtaining a weighted average of two blue pixel values in a same row of pixels of the received image data closest to the output pixel location. The image statistics circuit can perform various operations to collect statistic information associated with the first demosaiced image data.

The second demosaicing circuit performs 620 demosaicing of the received image data to generate a second demosaiced image. Other stages in the processing pipeline such as a resample processing stage, noise processing stage, color processing stage, and output rescale stage (e.g., resample processing stage 308, noise processing stage 310, color processing stage 312, and output rescale module 314) perform processing of the second demosaiced image.

The processing circuit pipeline performs 630 at least one of resampling, noise processing, color processing, and output rescaling performed on the second demosaiced image based on the statistics information obtained from the first demosaiced image. The other stages of the processing circuit pipeline can use the image statics information computed by the image statistics circuit on the first demosaiced image for processing the second demosaiced image.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. An apparatus for processing image signal data, comprising:
an image statistics circuit configured to generate statistics information on a received image data by processing a first demosaiced image, the image statistics circuit comprising a first demosaicing circuit configured to process the received image data to generate the first demosaiced image;
a second demosaicing circuit configured to perform demosaicing of the received image data to generate a second demosaiced image; and
a processing circuit pipeline configured to perform at least one of resampling, noise processing, color processing and output resealing on the second demosaiced image after receiving the statistics information generated by the image statistics circuit.

2. The apparatus of claim 1, wherein the first demosaicing circuit has a latency lower than a latency of the second demosaicing circuit.

3. The apparatus of claim 1, wherein the first demosaicing circuit is configured to generate the first demosaiced image by, for each output pixel location, obtaining an average of two green pixel values in different rows of the received image data adjacent to the output pixel location.

4. The apparatus of claim 1, wherein the first demosaicing circuit is configured to generate the first demosaiced image by, for each output pixel location, obtaining a weighted average of two red pixel values in a same row of received image data closest to the output pixel location.

5. The apparatus of claim 4, wherein one of the red pixel values is weighted three times compared to another of the red pixel values.

6. The apparatus of claim 1, wherein the first demosaicing circuit is configured to generate the first demosaiced image by, for each output pixel location, obtaining a weighted average of two blue pixel values in a same row of pixels of the received image data closest to the output pixel location.

7. The apparatus of claim 6, wherein one of the blue pixel values is weighted three times compared to another of the blue pixel values.

8. A method of demosaicing image data from an image sensor, comprising:
generating, by an image statistics circuit, statistics information on a received image data by processing a first demosaiced image, the image statistics circuit comprising a first demosaicing circuit configured to process the received image data to generate the first demosaiced image;
performing, by a second demosaicing circuit, demosaicing of the received image data to generate a second demosaiced image; and
performing, by a processing circuit pipeline, at least one of resampling, noise processing, color processing and output resealing on the second demosaiced image after receiving the statistics information generated by the image statistics circuit.

9. The method of claim 8, wherein the first demosaicing circuit has a latency lower than a latency of the second demosaicing circuit.

10. The method of claim 8, wherein the first demosaicing circuit generates the first demosaiced image by, for each output pixel location, obtaining an average of two green pixel values in different rows of the received image data adjacent to the output pixel location.

11. The method of claim 8, wherein the first demosaicing circuit generates the first demosaiced image by, for each output pixel location, obtaining a weighted average of two red pixel values in a same row of received image data closest to the output pixel location.

12. The method of claim 11, wherein one of the red pixel values is weighted three times compared to another of the red pixel values.

13. The method of claim 8, wherein the first demosaicing circuit generates the first demosaiced image by, for each output pixel location, obtaining a weighted average of two blue pixel values in a same row of pixels of the received image data closest to the output pixel location.

14. The method of claim 13, wherein one of the blue pixel values is weighted three times compared to another of the blue pixel values.

15. An electronic device, comprising:
an image sensor configured to generate image data;
an image statistics circuit configured to generate statistics information on a received image data by processing a first demosaiced image, the image statistics circuit comprising a first demosaicing circuit configured to process the received image data to generate the first demosaiced image;
a second demosaicing circuit configured to perform demosaicing of the received image data to generate a second demosaiced image; and
a processing circuit pipeline configured to perform at least one of resampling, noise processing, color processing and output resealing on the second demosaiced image after receiving the statistics information generated by the image statistics circuit.

16. The electronic device of claim 15, wherein the first demosaicing circuit has a latency lower than a latency of the second demosaicing circuit.

17. The electronic device of claim 15, wherein the first demosaicing circuit is configured to generate the first demosaiced image by, for each output pixel location, obtaining an average of two green pixel values in different rows of the received image data adjacent to the output pixel location.

18. The electronic device of claim 15, wherein the first demosaicing circuit is configured to generate the first demosaiced image by, for each output pixel location, obtaining a weighted average of two red pixel values in a same row of received image data closest to the output pixel location.

19. The electronic device of claim 15, wherein the first demosaicing circuit is configured to generate the first demosaiced image by, for each output pixel location, obtaining a weighted average of two blue pixel values in a same row of pixels of the received image data closest to the output pixel location.

20. The electronic device of claim 19, wherein one of the blue pixel values is weighted three times compared to another of the blue pixel values.

* * * * *